United States Patent [19]

Koppensteiner

[11] 3,839,725
[45] Oct. 1, 1974

[54] CAMERA RANGEFINDING AND FOCUSING DEVICE

[75] Inventor: Eugene F. Koppensteiner, Niles, Ill.

[73] Assignee: Bell & Howell Company, Chicago, Ill.

[22] Filed: Jan. 22, 1971

[21] Appl. No.: 108,842

[52] U.S. Cl. .................. 354/199, 354/198, 356/8
[51] Int. Cl. .......................................... G03b 3/00
[58] Field of Search .................. 95/44 C, 45, 44 R; 352/139, 140; 356/8; 354/198, 199

[56] References Cited
UNITED STATES PATENTS
3,584,559  6/1971  Levin .................................. 95/44 C Primary Examiner—Samuel S. Matthews
Assistant Examiner—E. M. Bero
Attorney, Agent, or Firm—John E. Peele, Jr.

[57] ABSTRACT

A distance determining mechanism usable with an optical instrument having a focusable lens and a viewfinder, the mechanism including within the viewfinder housing a base indicator formed as a movable member balanced for movement under the influence of gravity in response to inclination of the viewfinder to align the indicator with the base of the image of a remote subject. The lens is coupled mechanically to an index pointer visible in the viewfinder which pointer, when aligned with the indicator by adjustment of the lens focus ring, causes the lens to be focused on the subject.

10 Claims, 3 Drawing Figures

PATENTED OCT 1 1974
3,839,725
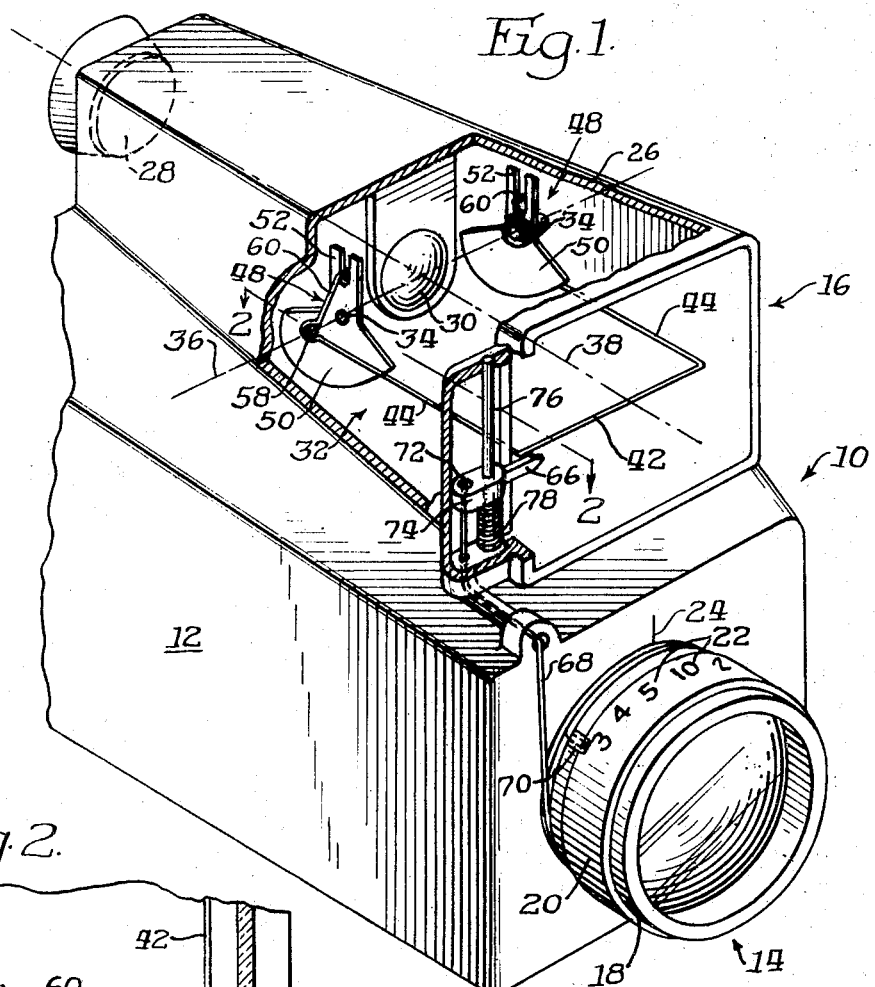
Fig.1.
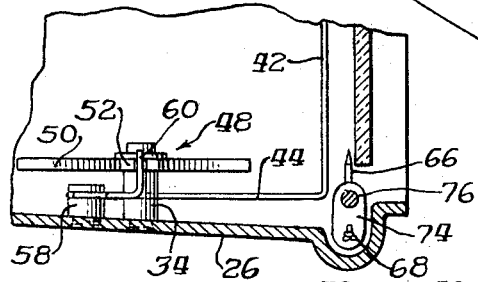
Fig.2.
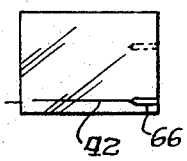
Fig.3.
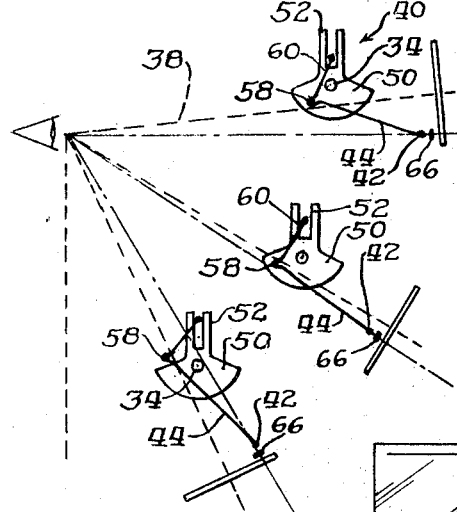
Inventor:
Eugene F. Koppensteiner.
By William F. Plunk
John E. Peele Jr. Attys

CAMERA RANGEFINDING AND FOCUSING DEVICE

The present invention relates to a lens focusing aid or range determining device using the principle of triangulation in cooperation with a balanced member to determine instrument-to-subject distance which distance is convertible into a lens focus condition by a mechanical coupling of the lens.

Range determining devices using the principle of triangulation for determining the distance between a camera and a subject are known. One class of these devices includes a gravity responsive mechanism having a pendulous member which swings relative to the optical axis of an objective. The influence of gravity orients the member to an aspect corresponding to focal distance as determined by the inclination of the axis, when the optical axis of the instrument is aimed at the base of a subject. To determine the location of the image in the viewfinder relative to the optical axis, it has been a practice to engrave or otherwise form a fixed reference substantially within the center of the viewfinder, which reference is a horizontally oriented line coinciding with the optical axis of the viewfinder. The reference is used for determining the range at which the objective of the optical instrument is to be focused. However, the reference is fixed in the viewfinder and remains substantially in the center of the scene being viewed at all times. Hence, this type of reference becomes distracting to the user.

Another teaching of a range determining device using triangulation, overcoming some of the disadvantages of prior art devices, has been described in a copending application to Darvasi, Ser. No. 50,503 filed June 29, 1970 and assigned to the assignor of this application. The device is built into the viewfinder of an optical instrument having a focusable objective. The device has a balanced indicator which seeks a horizontal position under the influence of gravity and independently of the orientation of the viewfinder axis. The indicator moves relative to reference indicia visible in the viewfinder, which information when read by the operator must be transferred to the objective of the instrument. The objective, however, is uncoupled relative to the triangulation device.

In accordance with the present invention, the range or distance determining mechanism usable with an optical instrument having a focusable objective and a viewfinder is provided. The position of an indicator of the mechanism is oriented under the influence of gravity when the base line of the image of a remote subject is aligned in the viewfinder on the indicator. A reference index pointer is coupled to the focusable objective. Bringing the index pointer into visual alignment with the indicator brings the objective into focus on the subject.

The geometry of the system uses as the hypotenuse of a right triangle of a line of sight directed at the base of a remote subject when that base is aligned with a movable reference. Eye level of a standing adult of average height is used as the vertical dimension. Changes of the angle between the hypotenuse and the vertical upon viewing the base of the subject generates the additional information required to ascertain instrument-to-subject distance.

It is an object of the invention to provide a range determining device having the foregoing characteristics which will be efficient in use, durable, and which can be manufactured for a reasonable cost.

Further and other objects will be apparent from descriptions of the accompanying drawings in which like numerals refer to like parts.

In the drawings:

FIG. 1 is a perspective view of a camera and a viewfinder shown schematically, with parts broken away and parts omitted, and illustrating embodiment of the invention;

FIG. 2 is a plan view of distance determining mechanism take along section line 2—2 of FIG. 1.

FIG. 3 is a diagrammatic showing of relative angular orientations of the camera, the optical axis, the balanced beam, and the viewfinder thereof when focusing on subjects at different relative distances.

Referring to the figures, an optical instrument is shown generally as a camera 10. The camera includes a housing 12 supporting a focusable objective lens 14 and a viewfinder assembly 16 through which a remote subject can be viewed. The lens is mounted in a barrel 18 fixed to housing 12 and is caused to be focused by manual adjustment of a lens focusing assembly shown as a ring 20. Scale indicia 22 on ring 20 are indicative of the distance at which the lens is focused when particular indicia is located relative to a reference mark 24. The viewfinder assembly includes a housing 26 formed on or in the camera housing and further includes at least an image exit optical element 28 through which the operator views the subject. Other optical elements of the viewfinder for focusing and erecting the images are shown typically as element 30. The optical system of the viewfinder is selected to enable an operator to view an image of remote subjects and components within the viewfinder.

Within housing 26 of viewfinder assembly 16 is mounted a balanced indicator assembly of the distance determining or rangefinding mechanism, generally indicated by reference numeral 32. Substantially aligned low friction pivot bearings, such as axles 34, support the assembly for movement about an axis 36 through the bearings, which are fixed to opposed internal walls of housing 26. Axis 36 extends across the viewfinder housing in perpendicular relation to the viewfinder optical axis 38, and preferably in the plane of that axis.

The indicator assembly 32 in this embodiment comprises a U-shaped wire formed as an indicator portion 42 which is visible in the viewfinder and first and second beam portions 44. A pair of carriers 48 are mounted on bearings 34 for pivoting movement thereon. Each carrier has a pendular mass portion 50 and a slotted arm portion 52 which arm portion is caused to attain a predetermined attitude, such as a vertical orientation, in response to pendular orientation of the carrier under the influence of gravity on the pendular mass portion.

A pin 58 is fixed to the housing wall adjacent to, but displaced from the bearings forming axis 34. A formed free end of each beam portion 44 of the indicator assembly passes about the pin which defines a pivot axis about which the indicator assembly 32 moves. A leg portion 60, terminating each beam portion engages in the slot of the slotted arm portion of the carrier 48.

By the interconnection of the indicator portion 42 with carrier 48 and the associated components, indicator portion 42 is caused to attain a balanced reference condition at all operative orientations of the viewfinder assembly. As the carrier 48 pivots about axis 36, the leg portions 60 of the indicator beam ends are moved by the slotted arm portions 52 of the carrier. Because the indicator assembly 32 is moved about fixed pivot 58, the indicator portion 42 is thus caused to move relative to the axis 36 as the carrier 48 pivots to a gravity oriented position. Hence, the position of the indicator portion 42 is a function of the angle of orientation of the optical axis of the instrument at any given operating instrument position. Moreover, the spacing of the axis through the pins 58 relative to the axis through the bearings 34 causes the indicator portion 42 to move through a larger effective arc than the slotted arm portion of the carrier 48 with the pendular mass portion 50.

For setting of focus of focusable objective lens 14, a reference index pointer 66, visible in the viewfinder, is coupled to focusing ring 20 by a coupling shown as a flexible, non-stretch cord 68. In the simplified embodiment shown, cord 68 passes along a path partially external and partially internal of camera housing 12, but may obviously be completely enclosed within the housing from any preceding position of the reference index pointer 66, such as is shown in phantom in FIG. 2, the pointer is displaceable vertically within the viewfinder as the lens is adjusted to conditions of focus by rotation of focusing ring 20. The coupling is dimensioned so that rotation of the lens focusing ring to align indicia 22 with reference mark 24 causes the pointer to attain a predetermined position. Coupling 68 is connected at one end to a receiver 70 in ring 20 and at the other end to a similar receiver 72 in the body portion of 74 of pointer 66. Pointer 66 is supported slidably on a vertically oriented rod 76, which rod is fixed to either camera housing 12 or viewfinder housing 26. Surrounding the rod is a coiled spring 78 which engages the pointer body and continuously urges the pointer upwardly. As ring 20 is rotated to wind or unwind the cord relative to a storage area about lens barrel 18, the pointer is respectively released for relative upward movement under the influence of return spring 78 or is pulled relatively downward against the action of the spring. The spring force is selected to be somewhat less than the friction force between the lens barrel 18 and ring 20 so that the spring cannot alter a focus setting.

The position of the pivot 58 relative to the pivot 34 and the length of the beam portion 44 and leg portion 60 are selected to render movements of the indicating portion 42 compatible in magnitude with related movements of the focusing ring 20 and the reference index pointer 66.

The structure of viewfinder assembly 16, indicator assembly 32 and cooperation of lens ring 20 and reference pointer 66 having been described, the operation of the distance determining system becomes apparent. Because the indicator assembly continuously seeks a balanced condition responsive to orientation of masses 50 under the influence of gravity, inclination of viewfinder housing 26 causes an apparent change in the position of indicator 42 as shown in FIG. 2. This change of the location of the indicator in the viewfinder causes the indicator to assume a determinable orientation in response to inclination of the viewfinder axis 38. Following alignment of the base line of the image of a remote subject with indicator 42, the operator rotates the lens in the direction required to bring reference pointer 66 into alignment with the indicator. Because of the coupling between the lens focusing ring 20 and the pointer 66, the lens is thereby adjusted to a condition of focus on the subject.

It should be noted that when the camera is in a substantially horizontal attitude, the indicator portion 42 is disposed at or near the bottom of the viewfinder and, hence, does not distract the user during viewing of the subject following focusing.

Although the indicator assembly is shown mounted to carriers on opposite sides of viewfinder assembly with the indicator extending across the width of the viewfinder, an indicator of partial viewfinder width might be supported by a single carrier with a counterweight adjusted therefor. Further, coupling 68 may be formed as gears or cams to connect focusing ring 20 of the lens with pointer 66. Additionally, the balanced indicator assembly 32 may be supported for orientation about axis 36 rather than about pin 58 which is displaced from the axis.

It is to be understood that the embodiment shown illustrates the principle of the construction, and changes and modifications can be made without departing from the spirit and scope of the invention.

What is claimed is:

1. A distance determining mechanism operable on the triangulation principle and usable with an optical instrument having a housing supporting a focusable objective and a viewfinder for viewing of a subject remote from the instrument, comprising:
    indicator means supported pivotably in said housing to be visible in said viewfinder and to be movable relative to said viewfinder by gravity in response to orientation of said viewfinder;
    adjustable reference means visible in said viewfinder and movable into visual alignment with said indicator means; and
    means coupling said reference means with the focusable objective to cause movement of said reference means upon adjusting focus of said objective whereby said reference means is movable into alignment with said indicator means to indicate focus of said objective on the subject being viewed when said indicator means is concurrently aligned with a base line of the subject.

2. A mechanism as in claim 1 wherein said indicator means is counter balanced to move under the influence of gravity.

3. A mechanism as in claim 1, wherein said coupling is a flexible, non-stretch cord operably connected to said pointer and a focusing ring of said focusable objective.

4. A distance determining mechanism operable on the triangulation principle and usable with an optical instrument having a housing supporting a focusable objective and a viewfinder for viewing of a subject remote from the instrument, comprising:
    indicator means supported in the housing to be visible in the viewfinder, and being movable relative to said viewfinder by gravity in response to orientation of said viewfinder so as to align therewith a base of the subject being viewed;
    pointer means visible in said viewfinder and arranged for movement; and
    means coupling said pointer means with the focusable objective wherein upon adjusting focus of said objective, said pointer means is moved into alignment with said indicator means to cause focusing of said objective on the subject being viewed and the base of which is aligned with said indicator means.

5. A mechanism as in claim 4 comprising biasing means to urge said pointer toward one end of a movement range.

6. A mechanism as in claim 5 wherein said coupling is arranged to release said pointer for movement by said biasing means and to positively move said pointer against the urging of said biasing means.

7. A distance determining mechanism operable on the triangulation principle and usable with an optical instrument having a housing supporting a focusable objective and a viewfinder for viewing of a subject remote from the instrument, comprising:

indicator means supported pivotably in said housing to be visible in said viewfinder, and to be movable relative to said viewfinder in response to orientation of said viewfinder;

indicator balancing means fixed to said indicator means to orient same in response to gravity;

adjustable reference means visible in said viewfinder; and means coupling said reference means with the focusable objective wherein upon adjusting focus of said objective, said reference means is adjusted into alignment with said indicator means therein focusing said objective on the subject being viewed.

8. A mechanism as in claim 7 wherein said indicator means is movable vertically in a visual path in said viewfinder and said reference means is adjustable along a similar path.

9. In an optical instrument having a focusable objective, a viewfinder for visually framing the image of a subject remote from said instrument, and a housing for said viewfinder, the combination therewith of a focusing aid operable on the triangulation principle comprising:

indicator means mounted in said viewfinder housing for free pivotal movement relative to said viewfinder under the influence of gravity, said indicator means being visible in said viewfinder for alignment with the image of the base of the subject being viewed through said viewfinder;

adjustable reference means visible in said viewfinder and movable into visual alignment with said indicator means; and means coupling said reference means with said focusable objective to assure movement of said reference means upon adjusting focus of said objective such that said objective may be focused on a subject being viewed by adjustment of said objective to bring said reference means into visual alignment with said indicator means while said indicator means is concurrently aligned with the base of the subject.

10. The combination defined in claim 9 wherein said indicator means comprises:

a pendulous member mounted in said viewfinder for free pivotal movement under the influence of gravity about a first pivot axis, said pendulous member having a longitudinal slot; and a beam assembly mounted in said viewfinder housing and including an indicating element oriented transversely of the viewfinder axis for viewing through the viewfinder and a supporting element connected at one end to said indicating element and having a portion at its opposite end slidably engaged in said longitudinal slot in said pendulous member, said supporting element being pivotally mounted intermediate its ends for free pivotal movement about a second pivot axis parallel to and spaced from said first pivot axis in response to movement of said pendulous member relative to said viewfinder housing to impart movement to said indicating element along an arcuate path such that arcuate movements of said indicating element are compatible with related movements of said reference means.

* * * * *